Jan. 28, 1930. M. I. MATHEWSON ET AL 1,744,781
TENSIONING DEVICE FOR DRIVING BELTS
Filed May 13, 1927 3 Sheets-Sheet 1

Jan. 28, 1930. M. I. MATHEWSON ET AL 1,744,781
TENSIONING DEVICE FOR DRIVING BELTS
Filed May 13, 1927   3 Sheets-Sheet 2
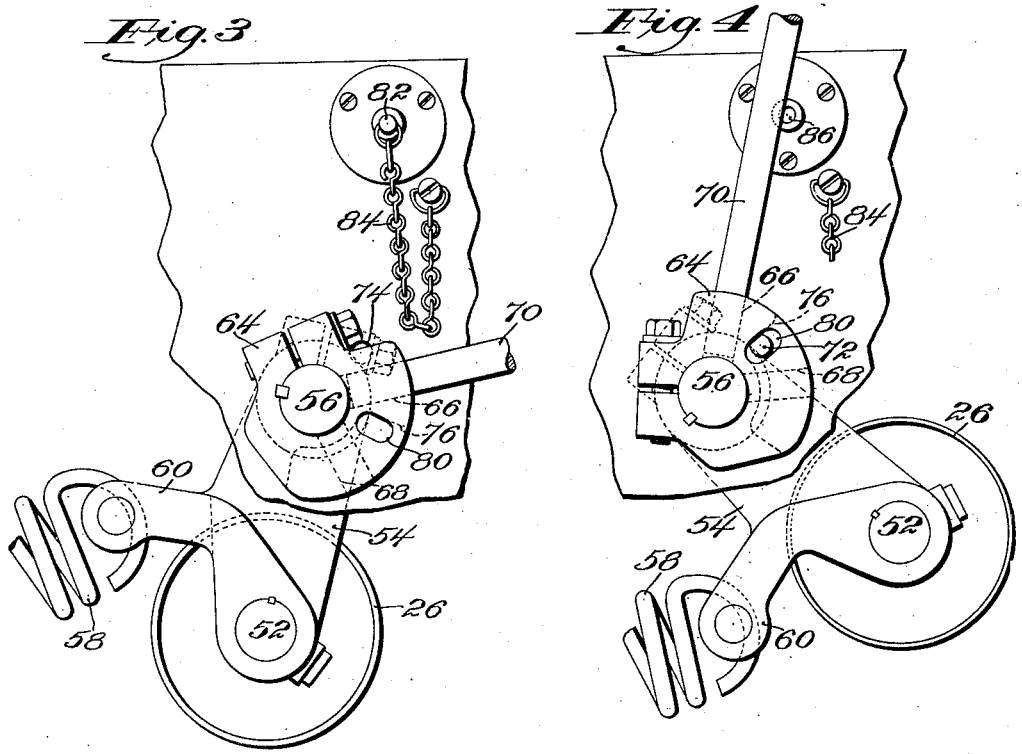
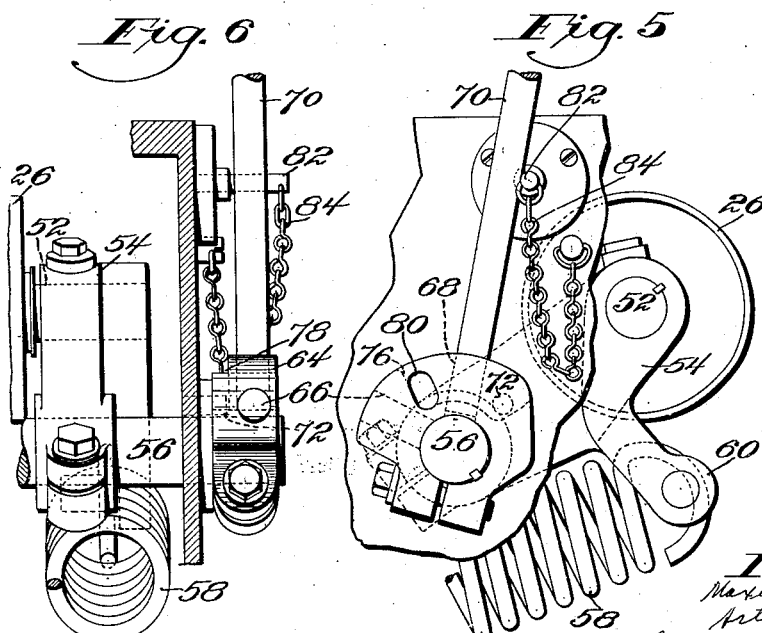
Witness
Jas. J. Maloney
Inventors
Maxwell I. Mathewson
Arthur Brown
by Van Everen Fish
Hildreth & Cary
Attys Jan. 28, 1930.    M. I. MATHEWSON ET AL    1,744,781
TENSIONING DEVICE FOR DRIVING BELTS
Filed May 13, 1927    3 Sheets-Sheet 3

Patented Jan. 28, 1930

1,744,781

UNITED STATES PATENT OFFICE

MAXWELL I. MATHEWSON, OF PROVIDENCE, AND ARTHUR BROWN, OF CRANSTON, RHODE ISLAND, ASSIGNORS TO BROWN AND SHARPE MANUFACTURING COMPANY, A CORPORATION OF RHODE ISLAND

TENSIONING DEVICE FOR DRIVING BELTS

Application filed May 13, 1927. Serial No. 191,071.

The invention relates to tensioning devices for driving belts.

One object of the invention is to provide a novel and improved tensioning device for maintaining on a driving belt, at all times, a substantially even and constant tension for a considerable range of slackening off or taking up on the belt.

A further object of the invention is to provide novel and improved means for raising or lowering the tensioning idler pulley manually to permit replacement or adjustment of the belt or of the belt driving pulley, said means involving the use of a shear pin or similar safety device.

Figure 1:
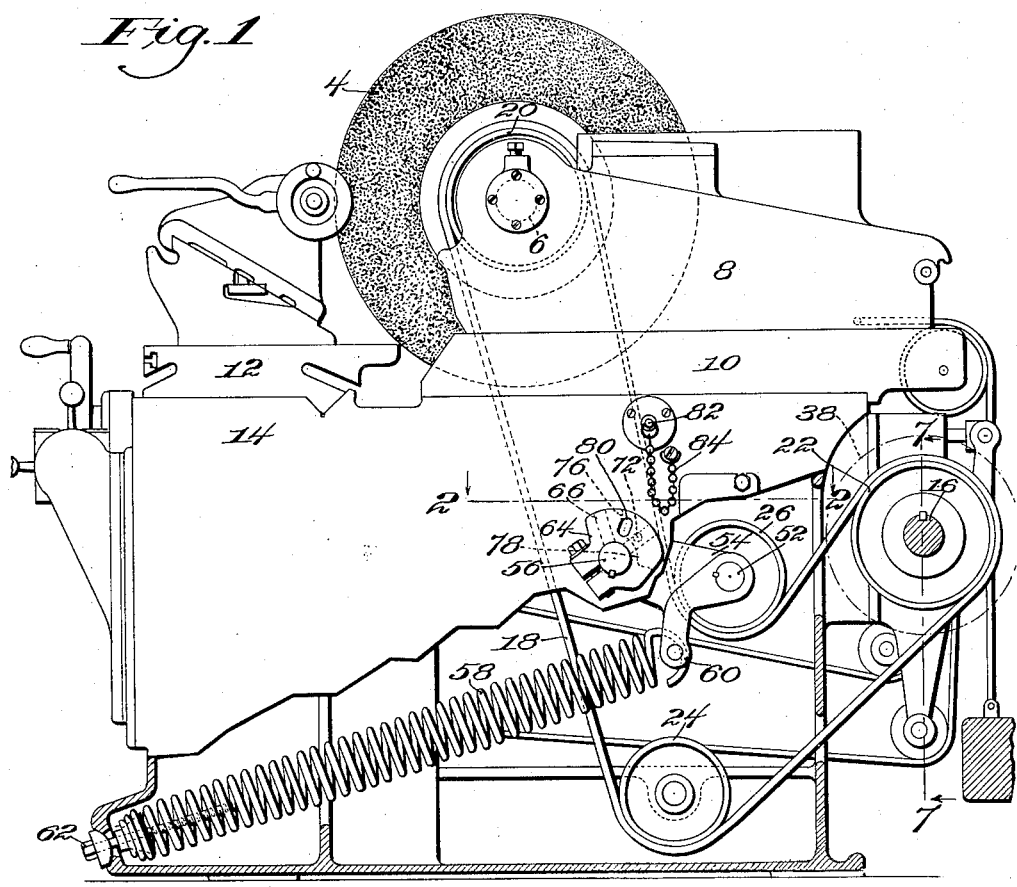
Figure 2:
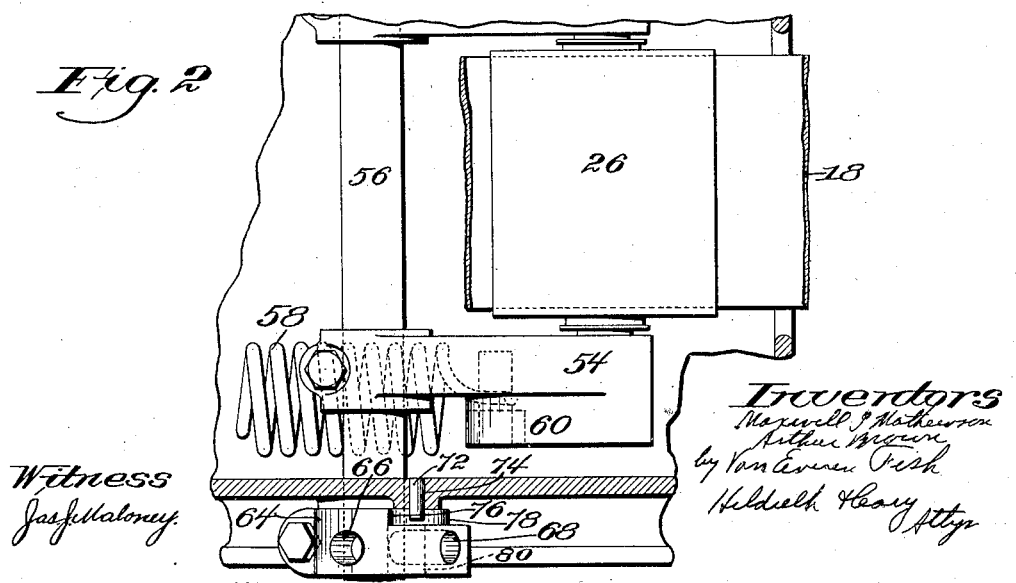
Figure 7:
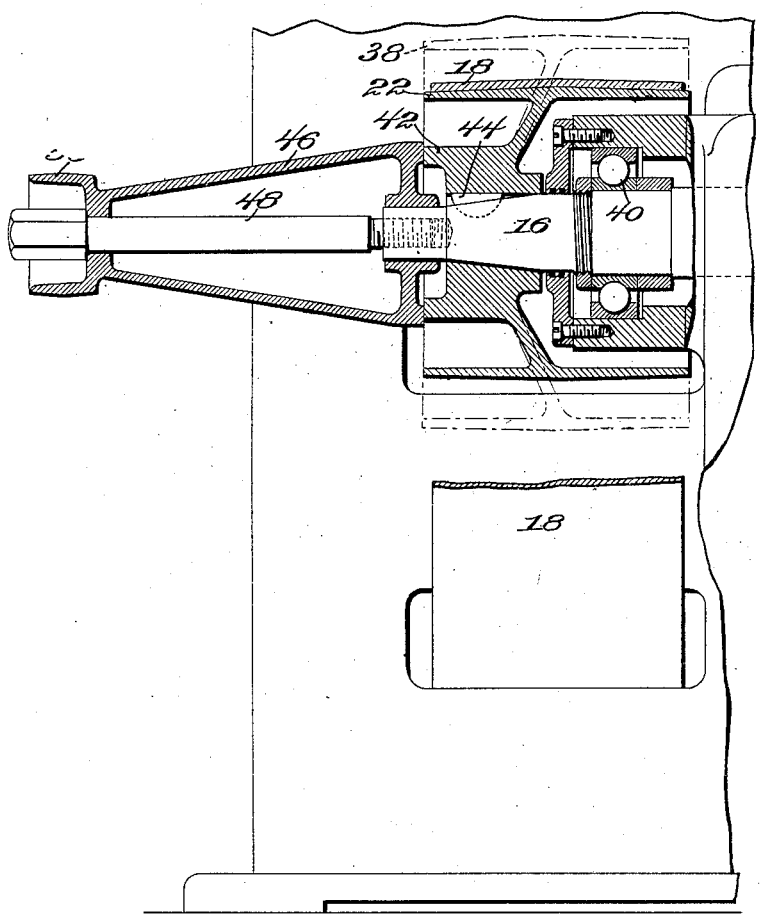

With these objects in view, the several features of the invention consist in the devices, combinations and arrangement of parts hereinafter described and claimed, and together with the advantages to be obtained thereby will be readily understood by those skilled in the art from the following description, taken in connection with the accompanying drawings:

In the drawings, Fig. 1 is a side elevation of a grinding machine embodying the present invention illustrating particularly the tensioning device for the wheel spindle driving belt; Fig. 2 is a detail plan view of the idler pulley and associated parts for tensioning the driving belt; Figs. 3, 4 and 5 are detail views in side elevation of the idler pulley and associated parts illustrating the manner in which the pulley is raised manually from its lowest position, Fig. 3 showing the pulley in its lowest position, Fig. 4 showing the pulley in an intermediate position resting against the shear pin, and Fig. 5 showing the pulley raised to its topmost position; Fig. 6 is a detail view in front elevation of the parts shown in Fig. 5; and Fig. 7 is a view in elevation partly in section, from the rear, illustrating particularly the driving pulley for the belt and in dotted lines a different sized pulley which may be substituted therefor.

In carrying out the invention a belt tensioning device is provided which is particularly adapted for use in a grinding machine, comprising an idler pulley which is mounted on a rotatable carrier and is moved in a direction to tension the belt by means of a tension spring. A tensioning device such as that herein disclosed which is particularly adapted for use with the wheel spindle drive must be adapted to maintain a constant tension for a considerable range of slackening off or taking up on the belt to allow for the movement of the spindle carriage and also to permit the substitution of different sized pulleys to secure the desired driving ratio for the driven member. In order to secure as wide a range of movement of the carrier as possible at a constant tension, the pivot about which the carrier rotates is so arranged with relation to the belt that a line connecting the pivot and the center of the pulley when in normal operating position is at substantially right angles to the direction of pull exerted on the pulley by the belt, and the tension spring is secured at a point so located that a line connecting said point and the pivot of the carrier is at substantially right angles to the direction of pull of the spring. The arrangement of parts herein described has the further advantage that the difference in the tension of the spring as it expands or contracts is approximately offset by the change in the effective length of the lever arm as it turns about the pivot.

A lifting device is provided for raising the idler pulley to release the tension on the belt and to permit the insertion of a new belt when necessary. This device comprises a lever arm for turning the carrier about its hub to raise the idler pulley, and a shear pin which operates to hold the pulley in an intermediate position to which it is raised by one turn of the lever arm. The shear pin has the further function of retarding the movement of the pulley in case the belt breaks and the pulley and carrier start to fall. In order to insure that a new shear pin is inserted in place of the old one when the pulley is again raised and placed in operation the parts are so constructed and arranged that the shear pin is made a necessary part of the mechanism for raising the pulley into operating position. From this point, supported by the shear pin, the pulley can readily be raised by a second turn of the hand lever well above operating position preparatory to putting on a new belt.

In case the belt breaks during the operation of the machine, the whole weight of the lever will be thrown suddenly onto the shear pin which is designed to give way before excessive strain is placed on the remaining parts of the machine while acting to considerably retard the falling movement of the pulley.

The idler pulley and its carrier and tension spring are constructed and arranged in such a way that the pulley will swing clear of the machine and as it passes over what may be termed the center position with the pulley hanging nearly plumb and the spring contracted to its greatest extent, the weight of the pulley and the spring will act to check its momentum, shortening the swing and thus further lessening the danger of injury to the rest of the machine.

Referring more specifically to the drawings, the grinding machine herein disclosed comprises a grinding wheel 4 mounted on a rotatable wheel spindle 6 in a grinding wheel carriage 8 which is adapted to move forward and back on a guideway 10 and a work supporting carriage 12 which is movable longitudinally of the grinding wheel spindle on a slide 14. The grinding wheel spindle 6 is driven from a driving shaft 16 by means of a driving belt 18 which runs over the pulley 20 on the grinding wheel shaft and the pulley 22 on the driving shaft 16, and under the fixed idler pulley 24, and the take-up idler pulley 26.

Different driving ratios may be readily obtained between the driving and driven shafts by substituting different sized pulleys for that indicated at 22 on the driving shaft 16 such as that indicated at 38 in dotted lines. As shown in Fig. 7 of the drawings, the driving shaft 16 is mounted at one end in a ball bearing 40 and is provided with a tapered portion projecting beyond the machine frame to receive the correspondingly bored hub 42 of the pulley. A key 44 is provided to lock the pulley 22 and the shaft 16 in turning relation and a conical shaped member 46 is placed on the end of the shaft abutting the hub of the pulley 22 and is held in position by means of a screw 48 to clamp the pulley firmly onto the shaft. A pulley 50 formed on the end of the member 46 may be utilized to drive the water pump of the machine.

The take-up idler pulley 26 is pivotally mounted at 52 on a carrier 54 which is secured to a pivot shaft 56 mounted to turn in suitable bearings on the machine frame. A heavy tension spring 58 secured at one end to an arm 60 rigidly mounted on the carrier 54 and at the other end adjustably secured to the machine frame by a screw bolt 62 tends to swing the carrier in a direction to tension the belt.

Due to the fact that different sized pulleys are used to secure different driving ratios for the wheel spindle, and due also to the movement of the wheel spindle relatively to the driving shaft 16 as the grinding wheel is moved up to the work there is a considerable slackening off and tightening up on the belt, resulting in a considerable change in the path of the belt and in the position of the belt tightening pulley. The belt must however be maintained at all times at a uniform tension. The idler pulley spring tensioning device is therefore arranged and constructed to maintain a constant tension for a considerable range of movement of the belt. To this end the point on the lever arm 60 to which the spring 58 is secured is positioned in angular relation to the hub of the carrier 54 so that a line connecting this point with the hub of the carrier will be approximately at right angles to the pull of the spring for the lowest operating position of the idler pulley. From this point as the belt is tightened the carrier will be rotated about its pivot causing the spring to be extended, but at the same time shortening the effective length of the lever arm 60 so that the change in the tension of the spring as the belt is tightened up or slackened off will be compensated for by the corresponding change in the effective length of the lever arm to maintain a constant tension for a considerable range of movement of the belt.

The idler pulley 26 and carrier 54 are mounted in such a manner as to swing down clear of the machine if the belt breaks, and after the pulley has reached the center position illustrated in Fig. 3 with the pulley hanging nearly plumb and the spring 58 contracted to its fullest extent, further movement of the pulley will be opposed and rapidly checked by the tension of the spring 58 and by the weight of the pulley, which will act to shorten the swing of the pulley and bring it quickly to rest without damage to the other parts.

A manually operable lifting device is provided for raising the idler pulley 26 from the position shown in Fig. 3 preparatory to placing a new belt on the machine. The device comprises a split bracket 64 which is securely clamped and keyed to turn with the pivot shaft 56 and has formed in its periphery two sockets 66 and 68 adapted to receive the manually operable lever arm 70. When it is desired to raise the pulley to its operative position the lever arm 70 is inserted in the socket 66 and turned through a quarter revolution raising the idler pulley to an intermediate position where it is held by means of a shear pin 72 which must now be inserted in a socket 74 in the machine frame and engages a shoulder 76 formed by one end of the recess 78 in the face of the bracket 64 to prevent the carrier from swinging down again. A hole indicated at 80 is cut in the bracket 64 to facilitate the insertion of the shear pin 72 in its socket. The lever arm 70 is now placed in the socket 68 to raise the idler pulley to its highest position well above its normal operating position where it may be held by means of a pin 82 which hangs on a chain 84 and may be inserted in the socket 86 formed in the machine frame.

When the idler pulley is to be placed in operation, the pin 82 is withdrawn and the pulley allowed to drop onto the belt assuming approximately the position shown in Fig. 1 to impose the required tension on the belt.

If the belt breaks during the operation of the machine, the idler pulley 26 will swing down bringing the shear pin 72 into contact with the shoulder 76 and tending to stop the rotation of the pulley carrier 54 or if the strain is excessive, and the pin is shorn off, to retard the pulley. The carrier with its momentum much decreased will then come to rest in its lowest position as previously described.

One form of the invention as embodied in a grinding machine wheel spindle drive having been described and illustrated, and the advantages to be obtained thereby having been pointed out, what is claimed is:

1. The combination with a driving belt of an idler pulley, a pivotally mounted carrier for the pulley, spring means for forcing the pulley in a direction to tension the belt, hand operated means for moving the idler pulley above operating position against the pressure of the spring by two successive stages, and a shear pin for holding the idler pulley in intermediate position.

2. The combination with a driving belt of an idler pulley, a pivotally mounted carrier for the pulley, spring means for forcing the carrier in a direction to tension the belt, a lifting lever, a plurality of sockets in the carrier to receive the lever to permit the turning of the carrier against the pressure of the spring by successive steps, and a shear pin which is inserted to hold the carrier in an intermediate position.

3. The combination with a driving belt of an idler pulley, a pivotally mounted carrier for the pulley, spring means for forcing the carrier in a direction to tension the belt, a shear pin to partially absorb the shock of the swinging carrier and pulley in case the belt breaks, and means for damping the movement of the carrier as it passes by center.

4. The combination with a driving belt of an idler pulley, a pivotally mounted carrier for the pulley, a tension spring secured at one end to the machine frame and at its other end to the carrier at a point to force the pulley downwardly to tension the belt, the parts being further arranged in case the belt breaks to bring the point of fastening of the spring to the carrier into line between the axis about which the carrier swings and the point of fastening of the spring to the machine frame while maintaining a tension on the spring as the pulley reaches its lowest point to oppose further movement of the pulley in either direction beyond the rest position of the pulley.

5. The combination with a driving belt of an idler pulley, a pivotally mounted carrier for the pulley, spring means for forcing the carrier in a direction to tension the belt and arranged upon breakage of the belt to damp the swing of the carrier at its bottom position of rest, and a shear pin to check the falling movement of the pulley.

6. The combination with a driving belt of an idler pulley, a pivotally mounted carrier for the pulley, a tension spring for forcing the carrier in a direction to tension the belt, a plurality of sockets in the carrier, a lifting lever adapted to raise the carrier against the pressure of the spring through one step for engagement with each socket, and a shear pin which is inserted to hold the carrier from falling back between steps.

7. The combination with a driving belt of an idler pulley, a carrier for the pulley, a pivot about which the carrier rotates so arranged with relation to the belt that a line connecting the pivot and the center of the pulley when in normal operating position is at substantially right angles to the direction of the pull exerted on the pulley by the belt, a tension spring and a lever arm formed on the carrier to which the spring is secured at a point so located that a line connecting said point and the pivot of the carrier is at substantially right angles to the direction of pull of the spring to maintain a constant tension on the belt for an appreciable movement of the carrier about its pivot.

8. The combination with a driving belt of an idler pulley, a carrier for the pulley, a pivot about which the carrier rotates so arranged with relation to the belt that a line connecting the pivot and the center of the pulley when in normal operating position is at substantially right angles from the pivot to the direction of the pull exerted on the pulley by the belt, a tension spring, a lever arm formed on the carrier to which the spring is secured at a point so located that a line connecting said point and the pivot of the carrier is at substantially right angles to the direction of pull of the spring to maintain a constant tension on the belt for an appreciable movement of the carrier about its pivot, and means for adjusting the position of one end of the tension spring to regulate the tension.

9. The combination with a driving belt of an idler pulley, a carrier for the pulley, a pivot about which the carrier rotates so arranged with relation to the belt that a line connecting the pivot and the center of the pulley when in normal operating position is subtantially at right angles from the pivot to the direction of pull exerted on the pulley by the belt, a tension spring and a lever arm formed on the carrier to which the spring is secured at a point so located that a line connecting said point and the pivot of the carrier for the lowest operating position of the pulley is at substantially right angles to the direction of pull of the spring and adapted to maintain a constant tension on the belt for an appreciable movement of the carrier about its pivot to this point.

10. The combination with a driving belt of an idler pulley, a carrier for the pulley, a pivot about which the carrier rotates so arranged with relation to the belt that a line connecting the pivot and the center of the pulley when in normal operating position is at substantially right angles from the pivot to the direction of the pull exerted on the pulley by the belt, a tension spring and a lever arm formed on the carrier to which the spring is secured at a point so located that a line connecting said point and the pivot of the carrier is at substantially right angles to the direction of pull of the spring to maintain a constant tension on the belt for an appreciable movement of the carrier about its pivot, the position of the parts being further adapted to cause the spring to damp the free movement of the pulley at its lowest point.

In testimony whereof we have signed our names to this specification.

MAXWELL I. MATHEWSON.
ARTHUR BROWN.